March 3, 1959  C. FARMER  2,875,508
METHOD OF WINDING ARMATURE CORES IN AN APPARATUS
Filed Nov. 15, 1956  4 Sheets-Sheet 1
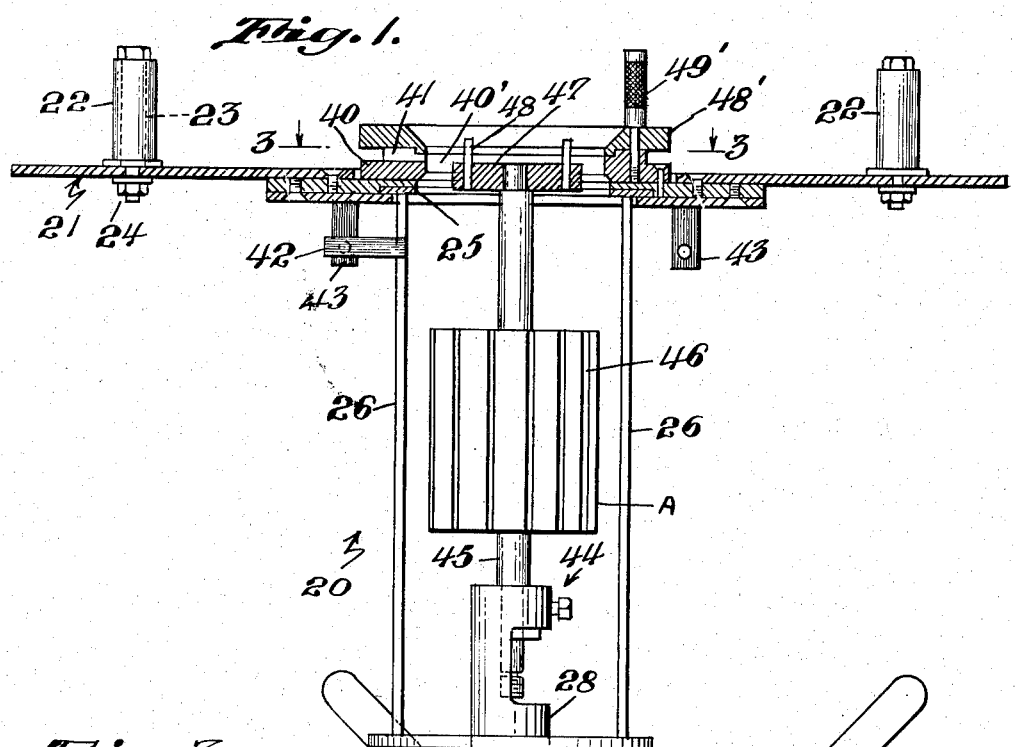
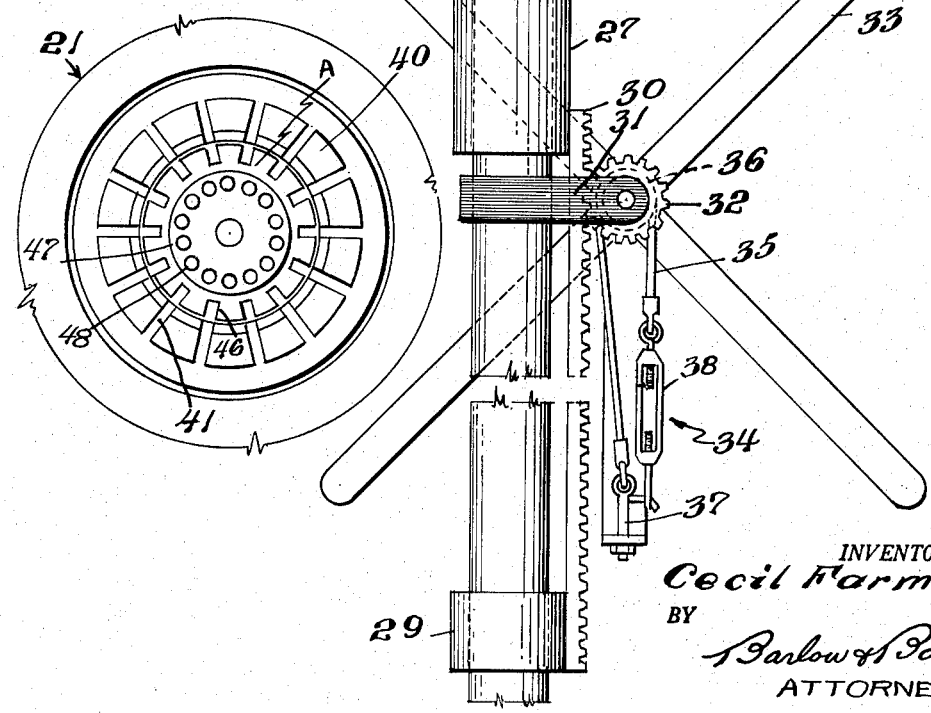
INVENTOR.
Cecil Farmer
BY
Barlow & Barlow
ATTORNEYS.

INVENTOR.
Cecil Farmer
BY
Barlow & Barlow
ATTORNEYS.

March 3, 1959 C. FARMER 2,875,508
METHOD OF WINDING ARMATURE CORES IN AN APPARATUS
Filed Nov. 15, 1956 4 Sheets-Sheet 3
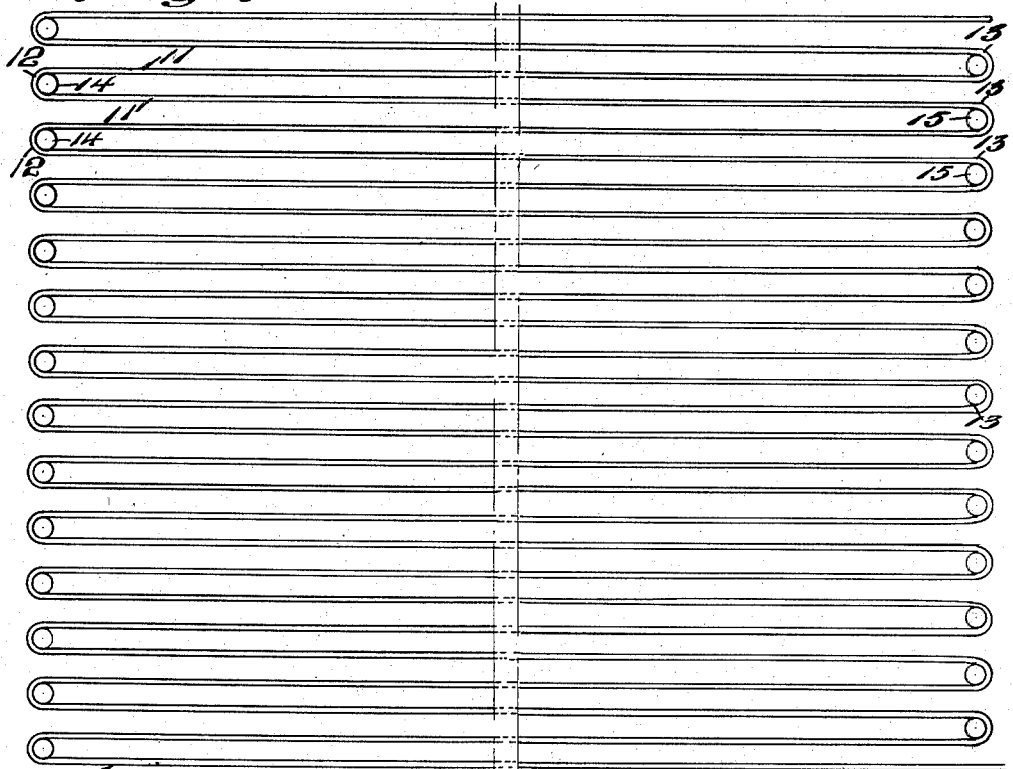
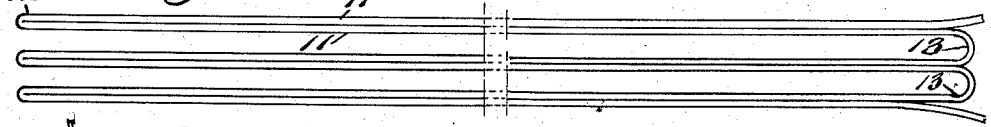
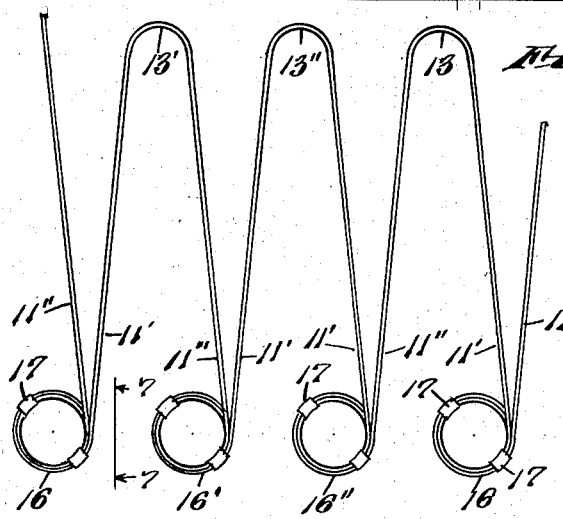
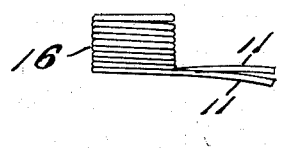
INVENTOR.
Cecil Farmer
BY
Barlow & Barlow
ATTORNEYS.

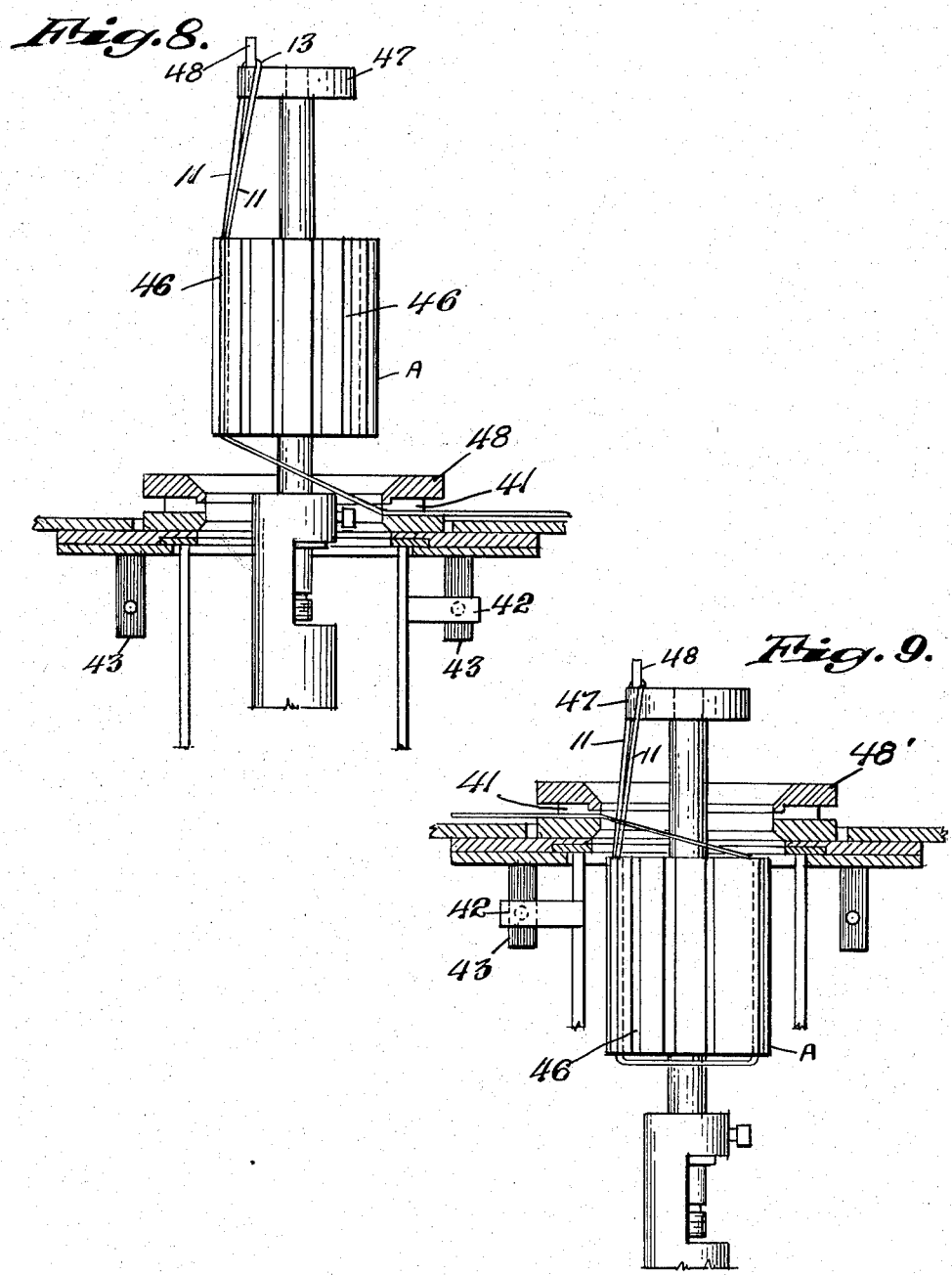

United States Patent Office 2,875,508
Patented Mar. 3, 1959

2,875,508
METHOD OF WINDING ARMATURE CORES IN AN APPARATUS

Cecil Farmer, Pawtucket, R. I.

Application November 15, 1956, Serial No. 622,335

8 Claims. (Cl. 29—155.58)

The invention relates to a method for winding an armature core of an electric generator or motor and a prearranged wire unit for use in carrying out the method.

In winding an armature core of the above character, it is desirable that the wind be such as to be both mechanically and electrically balanced. In one of the methods employed to produce the above results, the wires are guided from individual supplies and the coils are wound simultaneously which results in each coil being made of an equal length of wire, thus producing the balanced condition above mentioned. Another method which is practiced, particularly in the rewinding of armature cores, is to preform the coils and thereafter insert the coils in the said grooves of the armature core. Likewise, each coil is made of substantially the same length of wire, and the above balanced conditions occur. In each of the above methods of winding an armature core, each coil is separate of the other. After the winding operation, it is usual to test the winding for shorts and defects. In testing coils wound in the above manner, a separate test is made for each individual coil on the armature core.

An object of the invention is to provide for winding armature cores in a manner to result in a wind both mechanically and electrically balanced and in which only a single test for shorts and defects will be required to test all of the wiring of the wound armature.

A more specific object of the invention is to provide for winding armature cores from a single length of wire in such a manner that both a mechanically and electrically balanced wind will result.

Another object of the invention is to provide a prearranged wire in a manner such that several coils may be wound simultaneously about an armature core without severing the wire.

With these and other objects in view, the invention consists of certain novel features of construction as will be more fully described and particularly pointed out in the appended claims.

In the accompanying drawings:

Fig. 1 is an elevation view of an apparatus for use in carrying out the method of winding armatures embodying my invention;

Fig. 3 is a plan view taken substantially along line 3—3 of Fig. 1 showing the guides for leading the wire unit to the grooves of the armature and the anchor elements for holding the wire during the winding thereof about the armature;

Fig. 4 is a plan view showing a length of wire folded back upon itself into a plurality of equal portions;

Fig. 5 is a plan view of a fragmentary portion of the wire shown in Fig. 4 arranged in side by side double relation;

Fig. 6 is a plan view illustrating a further step in preparing the wire of Fig. 4 for winding an armature core;

Fig. 7 is a side elevation of a portion of the wire arrangement of Fig. 6 looking in the direction of the arrows on line 7—7 of Fig. 6; and Figs. 8 and 9 are similar sectional views of a fragmentary portion of the apparatus of Fig. 1 illustrating different relations of elements in winding the wire unit of Fig. 6 on an armature core.

Figure 2:
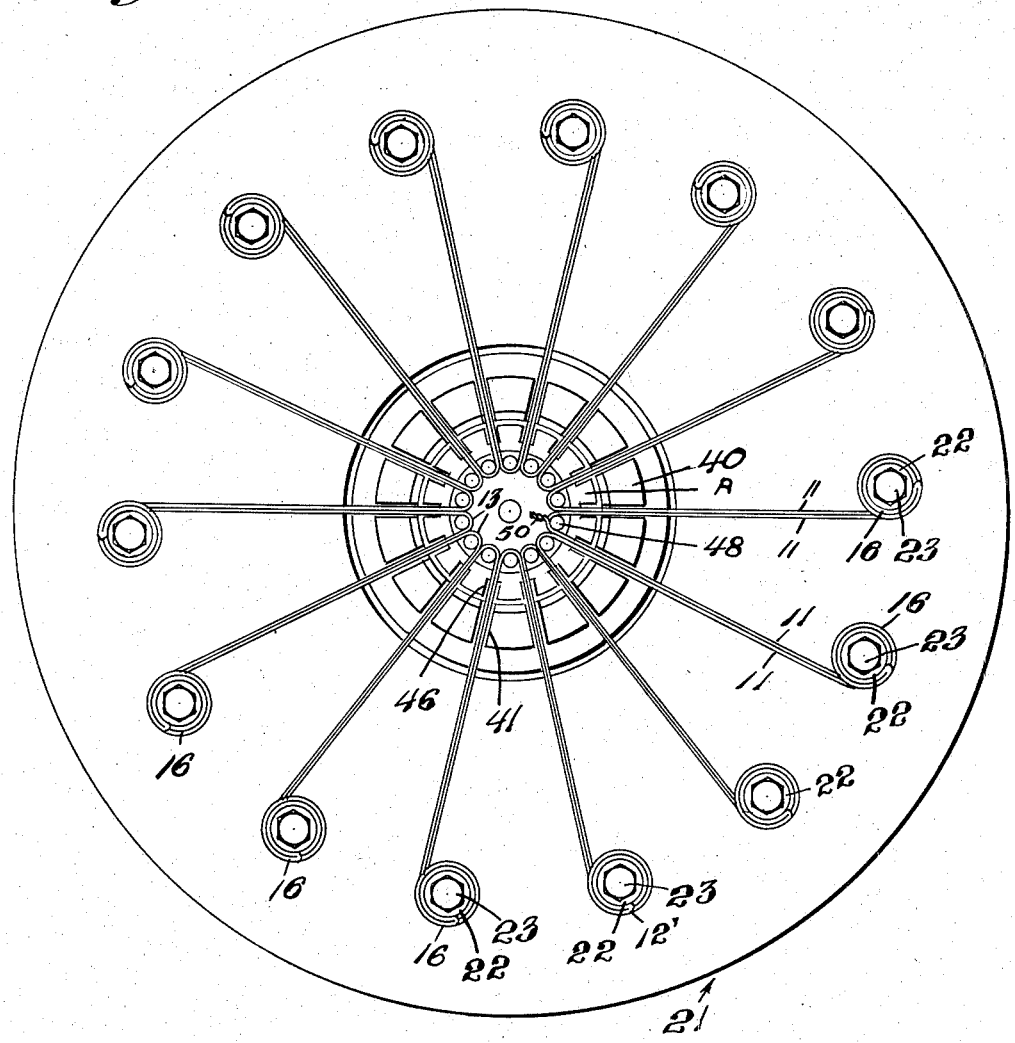
Fig. 2 is a plan view of the apparatus of Fig. 1 with the wire holding annulus removed showing the wire unit embodying my invention in position on the apparatus.

Referring to Figures 4 to 7, I have illustrated, as by way of example, a simple method which may be practiced in carrying out one phase of the invention. It will be, however, apparent to those skilled in the art that other modes of procedure may be practiced to result in the finished product shown in Fig. 6. According to the disclosure of the above figures, I provide a wire 10 in a length sufficient to completely wind an armature. The wire is of a kind usually employed for winding armatures and is electrically insulated in the known manner. For the sake of clarity in illustration and description, wire 10 is shown as being a single wire but is to be considered as being representative of one or more wires electrically insulated one from the other and positioned side by side. The number of wires depends upon the particular number of parallel coils to be wound on the armature. Hereinafter, when reference is made to said wire 10, it is to be understood that the term "wire" is to be considered as referring to either a single wire or a plurality of wires positioned side by side as above mentioned.

The wire 10 may be first folded back upon itself into a plurality of equal portions 11 which are connected at one end by a bight 12 and at the other end by a bight 13. There are a number of pairs of wire portions 11 equal to the number of grooves in the armature to be wound. The wire 10 may be readliy folded back upon itself by the use of properly located rows of supported spaced pins 14 and 15 about which the wire may be wound back and forth in S shape fashion. Upon removing the wire from the pins 14 and 15, the bight 12 may be closed as at 12' (see Fig. 5) which will position each pair of wire portions 11 side by side. Each pair of wire portions 11 for nearly the full length thereof is wound into a separate coil 16 (see Fig. 6). The two wire portions 11 of each coil serve to provide a continuation of the wire from coil to coil. See Fig. 6 in which the wires extending from each coil are indicated 11' and 11". The wire length 11' of one coil 16 is connected by the bight 13' to the wire length 11" of the next adjacent coil 16'. The wire 11' of coil 16' is connected by the bight 13" to an adjacent wire length 11' of an adjacent coil 16". Thus the wire 10 is arranged in a plurality of coils in a number equal to the number of grooves or slots in the armature core to be wound, each coil being formed of a doubled portion of wire which continues one to the other whereby an uninterrupted path is had for electric current to flow from one end of said wire to the other. A binding tape 17 may be wrapped about the coils 16 to hold them in position during storage and transporting to a location of use.

It will be apparent from the above that I have disclosed a wire arranged in a manner so as to provide a wire unit having a plurality of separate portions each of a length sufficient to wind the required number of turns about an armature and in which each portion of wire is a continuation of the other. Thus the wire unit after being wound on the armature may be electrically tested by passing an electric current through all of the units from one end thereof to the other.

In Fig. 1, I have shown an apparatus 20 which is particularly adapted for use in winding an armature with wire units prepared as above described. The apparatus has a turntable 21 on which there is mounted a plurality of spools 22 each rotatable about a stud 23 which is secured to the table as at 24. The spools 22 (see Fig. 2) are equally spaced angularly about the center and are equal in number to the number of grooves in the armature core A to be wound. The table 21 is rotatable about an annulus 25 which is connected by means of depending rods 26 to a sleeve 27 which is axially slidable on a stationary post 28. A second sleeve spaced from the sleeve 27 is also slidable along post 28 and is connected to sleeve 27 by means of a vertically disposed toothed rack bar 30. A bracket 31 is fixedly secured to the post 28 between the sleeves 27, 29 and straddles the said rack bar 30. The bracket 31 forms a guide between which the rack bar 30 is reciprocated and also blocks rotary movement of the sleeves and thereby the annulus 25. A gear pinion 32 is mounted on bracket 31 and extends into engagement with the rack bar 30 and is manually rotatable by handles 33 which are associated with said pinion gear 32 in a known manner. Thus, turning the pinion gear 32 clockwise as seen in Fig. 1 will raise the table 21 and turning the said pinion gear in the other direction will lower the said table. In order to block free gravitational movement of table 21, a friction brake device 34 is provided. As shown, this comprises a brake band 35 which may pass about the hub 36 or similar element attached to the pinion gear 32. One end of the band 35 is attached to a stationary held anchor 37. The other end of the band 35 has a turn buckle 38 attached thereto which in turn is also attached to the said anchor 37. Thus, the friction of the brake band may be adjusted so as to provide the desired friction between the brake band 35 and hub 36.

The table 21 has a central guide (see also Fig. 3) which is in the form of an annulus 40 which has a plurality of guide slots 41 which are radially disposed and equally angularly spaced. The slots 41 extend inwardly from the upper side of the annulus 40 and are equal in number to the number of grooves in the armature core A. The table is arranged to be turned 180° in each direction. To this end, a plate 42 is secured to one of the fixed rods 26 and is so located as to be engaged by a pair of diametrically disposed abutments 43 which depend from the table 21 and move therewith.

The upper end portion of post 28 carries a chuck designated generally 44 for receiving one end portion of the shaft 45 of the armature A so as to hold the same vertically with the grooves 46 thereof aligned with the guide slots 41. The bore 40' of the annulus 40 is of a diameter to provide sufficient clearance for the armature to pass therethrough during the axial reciprocation of the table 21.

The prepared wire unit of Fig. 6 is arranged on the table 21 in the manner shown in Fig. 2. Each coil 16 is positioned on a spool 22. The unwound wire portions 11 of each coil 16 are led from the coils 16 and passed through guide slots 41, and the bight 13 between adjacent coils 16 is passed over and about a pin 48 which is carried by an anchor 47. In the present instance, the anchor 47 is in the form of an annulus which is positioned on the upper portion of shaft 45 and carries a number of pins 48 equal to the number of grooves in the armature A. The pins are positioned to be at a location centrally between the grooves of the armature core A so that the wire portions extending therefrom will be in line with the said grooves 46 and slots 41. An annulus 48 (see Fig. 1) is positioned on the annulus 40 so as to lay across the slots 41 to block the wires against moving outwardly of the slots. The annulus 48' is detachably secured in position by a manually manipulated screw threaded bolt 49'. It may be found desirable to secure the free end portions of the wire unit to each other as by twisting the same about each other as at 50 (see Fig. 2).

Referring to Fig. 2, it will be seen each pair of unwound wire lengths 11 pass side by side in a slot 41, and the bight 13 which connects adjacent coils 16 is anchored to a pin 48. Also, it will be seen that, upon lowering the table 21 to beneath the armature core as seen in Fig. 8, the leading wire lengths 11 will be inserted into the grooves 46 of the core A. Upon indexing of table 21 180°, the wire lengths trailing from said grooves 46 will be carried by guide disk 40 to be in line with the grooves 46 which are at a position diametrically opposite to the initial grooves in which said wire lengths were inserted (see Fig. 8) in which the above motions have been illustrated but in which only a single wire portion has been shown for the sake of clarity. It will be understood that the wire portions 11 will have been simultaneously inserted in each of the grooves 46 of the armature. During the raising of the table 21, the wires will be inserted in the grooves with which they are aligned. Upon the table 21 being raised to initial position (see Fig. 9), the table may be indexed 180°, but in the opposite direction. This will carry the wires into the initial position of registry with the grooves of core A. The above cycle is repeated the number of times required to complete the wind of the armature, the wire being supplied from each of the unit coils 16.

Upon the required number of turns of wire having been made about core A, the bight 12' will have been spread apart and will lay in proper position at the end of the core. The wound core may now be removed from the apparatus. After the armature has been tested as previously described, the bights 13 may be all severed so as to separate each coil one from the other and further operations may be made to complete the wind of the coil in the known manner.

From the above description, it will be apparent I have disclosed a novel method of preparing a wire unit to be employed for winding an armature which will result in a wind which is mechanically and electrically balanced. It will be further apparent that I have disclosed a novel method of winding an armature core by using a single wire length and arranging the same to be wound about the core so as to result in a mechanical and electric balanced wind and in which all the coils extend in continuation with each other so as to permit a single test to be made as to damaged insulation during winding as previously described.

I claim:

1. A wire unit for use in winding armature cores of electrical generators and the like, comprising a length of insulated electrical conducting wire folded back upon itself into a plurality of equal lengths of doubled portions of wire connected to each other in consecutive order, each of said doubled portions of wire being wound in separate coils with the wire portions leading from each coil extending in continuation of the wire portion of the next adjacent coil.

2. A wire unit for use in winding a slotted armature core of an electrical generator and the like, comprising a length of insulated electrical conducting wire folded back upon itself into a plurality of equal lengths of doubled portions of wire equal in number to the number of slots in the core to be wound, said doubled portions of wire being wound in separate generally helical coils with the wire portions leading from each coil extending in continuation with the wire portion of the next adjacent coil.

3. A wire unit for use in winding a slotted armature core of an electrical generator and the like, comprising a length of insulated electrical conducting wire folded back upon itself into a plurality of equal lengths of doubled portions of wire equal in number to the number of slots of the core to be wound, said doubled portions of wire being wound in separate coils having equal lengths of wire portions and with the wire portions of each coil extending in continuation of the wire portion of the next adjacent coil.

4. A wire unit for winding a slotted armature core of an electrical generator and the like, comprising a length of electrical conducting wire wound into a plurality of coils equal in number to the number of slots in said core, each coil comprising a connected doubled portion of said wire extending in continuation of the wire portions of the next adjacent coil.

5. The method of preparing a length of electrical conducting wire for winding coils in the grooves of an armature core of an electrical generator and the like, comprising folding the said wire back upon itself a plurality of times into a plurality of equal lengths of doubled portions of wire connected to each other in consecutive order by a length of wire extending from one of said doubled portions to the other, each of said doubled portions being of a length sufficient to wind at least two coils in said armature core, the length of wire extending between adjacent coils forming a hook to anchor said wire with reference to said armature at one end portion thereof when winding said prepared length of wire onto said armature.

6. The method of preparing a length of electrical conducting wire for winding coils in the grooves of an armature of an electrical generator and the like, comprising folding the said wire back upon itself a plurality of times into a plurality of equal lengths of doubled portions of wire connected to each other in consecutive order by a length of wire extending from one of said doubled portions to the other, each of said doubled portions being of a length sufficient to wind at least two coils on said armature core, the length of wire extending between adjacent coils forming a hook so as to provide an anchor for detachably anchoring said wire lengths between coils with reference to one end portion of said core, and winding the doubled portion of said wire into separate coils for holding said doubled portion of wire separated when winding the same onto said core.

7. The method of winding coils in the grooves of an armature core of an electrical generator and the like, comprising the steps of providing a wire of a length sufficient to wind the required number of coils on said core, dividing the wire into a number of doubled wire portions of equal lengths and equal in number to the number of grooves in said core, anchoring the wire portions extending between each doubled portion with reference to said armature at one end portion thereof, thence inserting the lengths of double wire portions each into a separate groove of said core, thence continuing the winding of the trailing doubled portions of said wire into their respective grooves so as to complete the winding of the wire in coils in said grooves, then severing the wire at the anchored portions thereof.

8. The method of winding coils in the grooves of an armature core of an electrical generator and the like, comprising the steps of providing a wire of a length sufficient to wind the required number of coils on said core, dividing the wire into a number of doubled wire portions of equal lengths and equal in number to the number of grooves in said core with the doubled wire portion of one length extending in continuation with the doubled wire portion of an adjacent length, anchoring the wire portions extending between each of said doubled portions at one end portion of said core, thence simultaneously inserting each of said doubled wire portions into a separate groove in said core and thence continuing the winding of the trailing doubled portions of said wire in their respective grooves so as to complete the winding of the wire in coils in said grooves.

References Cited in the file of this patent
UNITED STATES PATENTS

| | | |
|---|---|---|
| 373,948 | Scribner | Nov. 29, 1887 |
| 2,315,300 | Vaillant | Mar. 30, 1943 |
| 2,404,185 | Mann | July 16, 1946 |